United States Patent [19]

Sliwa et al.

[11] 4,065,709

[45] Dec. 27, 1977

[54] DIGITAL APPARATUS FOR SETTING THE VOLTAGE ACROSS A CAPACITOR

[75] Inventors: Robert A. Sliwa, Woodcliff Lake; Edward J. Golden, Hamburg, both of N.J.

[73] Assignee: The Bendix Corporation, Teterboro, N.J.

[21] Appl. No.: 673,333

[22] Filed: Apr. 2, 1976

[51] Int. Cl.[2] ........................ F42C 11/04; G05F 1/62; H02J 15/00

[52] U.S. Cl. ........................................ 320/1; 102/19.2; 102/70.2 R; 323/9

[58] Field of Search ......... 102/19.2, 70.2 R, 70.2 GA; 323/9; 320/1

[56] References Cited

U.S. PATENT DOCUMENTS

| | | | |
|---|---|---|---|
| 3,737,754 | 6/1973 | Katz | 320/1 |
| 3,859,582 | 1/1975 | Kautz et al. | 320/1 |
| 3,913,006 | 10/1975 | Fillmore | 320/1 |

*Primary Examiner*—Stuart N. Hecker
*Attorney, Agent, or Firm*—Anthony F. Cuoco

[57] ABSTRACT

Apparatus is disclosed which permits digital setting of resistance-capacitance (R-C) type fuzes, and which apparatus corrects for variations in timing due to deviation of capacitance values from nominal.

6 Claims, 4 Drawing Figures

$I_O = \pm KV_{IN}$

DIGITAL APPARATUS FOR SETTING THE VOLTAGE ACROSS A CAPACITOR

BACKGROUND OF THE INVENTION

1. Field of the Invention

This invention relates generally to setting R-C fuzes and particularly to digitally setting the fuzes. More particularly, this invention relates to digitally setting fuzes of the type described while correcting for variations in timing due to capacitance deviations.

2. Description of the Prior Art

Electrical systems may require fuzes for time delayed actuation. The fuzes may be of the resistance-capacitance (R-C) type whereby capacitors provide the required time delay function. For purposes of illustration, such systems may be rocket or other types of weapons systems. The fuze capacitors discharge after firing of the weapon or upon impact to provide a time delay, after which the weapon detonates. In systems of the type described it is desirable that the fuzes be digitally preset and that means be provided for correcting variations in timing due to deviations of capacitance values from nominal.

SUMMARY OF THE INVENTION

This invention contemplates apparatus operating on the principle that the voltage across a capacitor rises linearly for a pulse of current applied to the capacitor. At the termination of the current pulse the voltage across the capacitor remains constant and equals the value of the current pulse divided by the capacitance of the capacitor. The arrangement of the invention applies a single current pulse in opposite senses to each of a pair of fuze capacitors and the respective capacitances are determined by measuring the voltages across the capacitors using an analog to digital converter, the output of which converter is applied to a computer which computes the value of the capacitances. Once the capacitances are determined a binary rate multiplier operates to provide a proper number of pulses for setting voltages across the fuze capacitors. The ratio of the voltages determines the fuzing time.

One object of the invention is to provide improved fuze setting apparatus which allows digital setting of R-C type fuzes are corrects for variations in timing due to the deviation of capacitor values from nominal.

Another object of this invention is to apply a current pulse to a capacitor and to ascertain its capacitance by measuring the voltage across the capacitor by using an analog to digital converter. The digital output is used to compute the capacitance of the capacitor.

Another object of this invention is to utilize the computed capacitance value for applying current pulses in opposite senses to each of a pair of fuze capacitors, and for providing the proper number of pulses to set voltages across the capacitors, with the ratio of said voltages determining the fuzing time.

The foregoing and other objects and advantages of the invention will appear more fully hereinafter from a consideration of the detailed description which follows taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
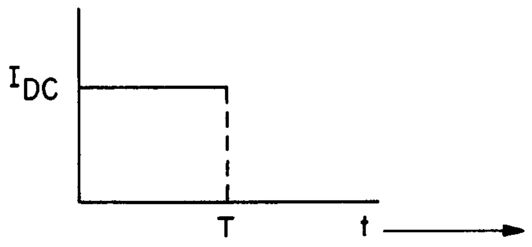
FIGS. 1 and 2 are graphical representations showing voltage and current variations across a capacitor as utilized in the device of the invention.
Figure 2:
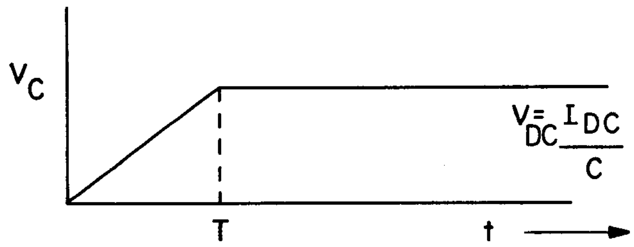

Referring first to FIGS. 1 and 2, the voltage ($V_C$) across a capacitor rises linearly in response to a current pulse ($I_{DC}$). At the termination of the current pulse the voltage across the capacitor remains constant. The final voltage ($V_{DC}$) across the capacitor is as follows:

$$V_{DC} = I_{DC}/C;$$

where C is the capacitance of the capacitor. This relationship is analyzed in the text *Transient & Steady State Analysis of Electric Networks* by Edward Peskin, D. Van Nostrand Co., Inc., Princeton, N.J. pages 196 to 199.

Thus, by applying a single current pulse to a capacitor its capacitance in digital terms can be ascertained by measuring the voltage across the capacitor, using an analog to digital converter. Once the value of the capacitance is known, a proper number of pulses required from a binary rate multiplier can be determined and used to set voltages in opposite senses across a pair of capacitors so that the capacitors function as fuzes. The ratio of the voltages across the capacitors determines the fuzing time.

Figure 3:
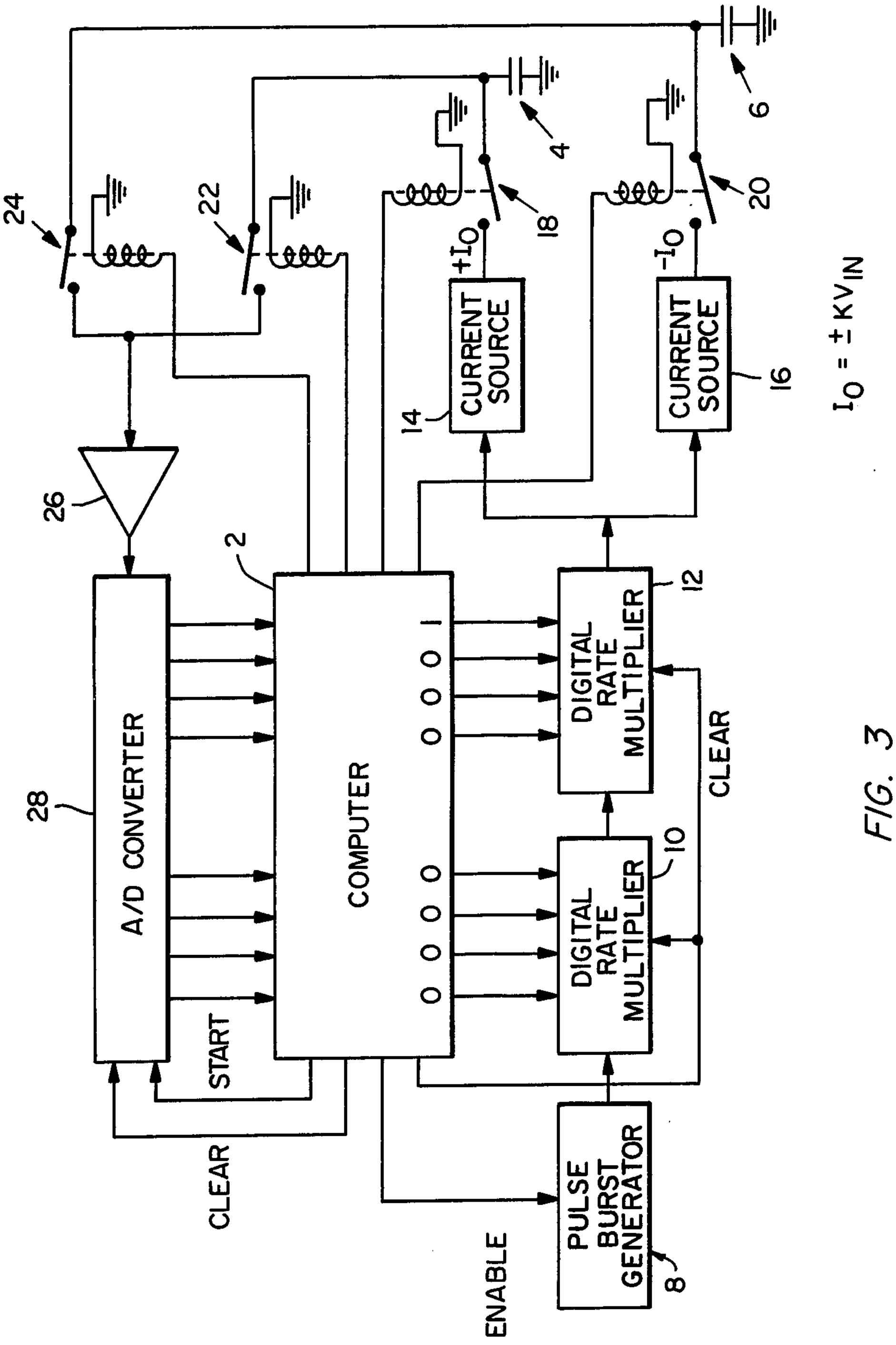
FIG. 3 is a block diagram showing the structural configuration of the elements of the invention.

With reference now to FIG. 3, the device of the invention is under control of a computer, micro processor or dedicated logic sequencer carrying the numerical designation 2, and which device 2 may be of the type manufactured by the Flight Systems Division of The Bendix Corporation and carrying their trade designation BDX-910 Processor. Capacitors 4 and 6 may be included in R-C fuzing mechanism of a system which must be actuated after some predetermined interval occurs. For purposes of illustration, the capacitors may be in the fuzing mechanism of a rocket or other weapons system and are considered discharged before the start of the fuzing sequence.

The fuzing sequence may be started upon firing of the weapon or upon impact thereof on a target as may be desired, and as is well known in the art.

Figure 4:
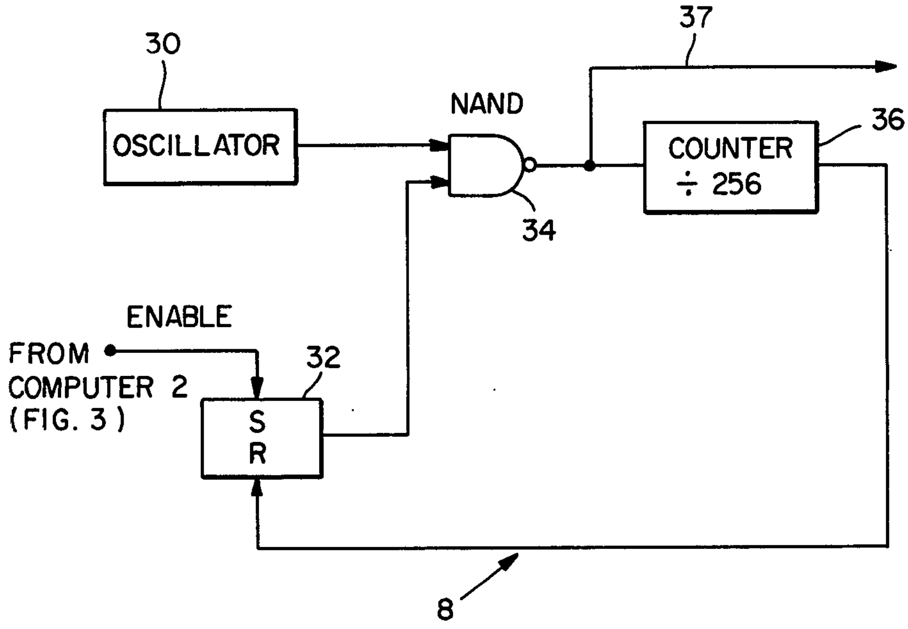
FIG. 4 is a block diagram showing a pulse burst generator illustrated generally in FIG. 3.

A pulse burst generator 8, which will be more fully described with reference to FIG. 4, is essentially a logic circuit driven by a clock which provides a fixed number of pulses whenever the pulse burst generator is enabled by an output of computer 2. The fixed number of pulses depends on the accuracy desired and whether a binary or binary coded decimal (BCD) digital rate multiplier such as digital rate multipliers designated by the numerals 10 or 12 are used. For purposes of illustration, digital rate multipliers 10 and 12 will be considered as binary digital rate multipliers arranged in cascaded fashion so as to have a precision of one part in $2^8$, with the required number of pulses therefore being 256.

Digital rate multipliers 10 and 12 are devices that provide a number of output pulses as a product of the number of input pulses times a preset digital number. Digital rate multipliers 10 and 12 may be conventional devices such as manufactured by the RCA Corporation and carrying their trade designation RCA CD4089.

As heretofore noted, digital rate multipliers 10 and 12 are arranged in cascaded fasion so that the digital rate output is provided by digital rate multiplier 12. Digital rate multiplier 12 drives current sources 14 and 16. Current sources 14 and 16 have the characteristic of providing output currents which are the product of a constant (K) times the input voltage ($V_{in}$). Current source 14 may provide an output current in a positive sense ($+I_O$) while current source 16 may provide an output current in a negative sense ($-I_0$). Current sources 14 and 16 may be of the conventional type manufactured by the National Semiconductor Corporation and described in their publication "Linear Applications", page AN31-6.

The output of current source 14 is applied to a normally open switch 18 and the output of current source 16 is applied to a normally open switch 20. Normally open switch 18 is connected to a normally open switch 22 and normally open switch 20 is connected to a normally open switch 24.

Switches 22 and 24 are connected to a high input impedance amplifier 26 which drives an analog to digital converter 28. The output from analog to digital converter 28 is applied to computer 2 in a manner and for purposes to be hereinafter described.

Although switches 18, 20, 22 and 24 are shown, for purposes of illustration, as relays, it will be understood that in the preferred embodiment of the invention the switches are solid state multiplex switches of conventional type such as manufactured by the Siliconex Corporation and carrying their trade designation DG 200. Amplifier 26 may be any conventional high input impedance operational amplifier, while analog to digital converter 28 is likewise of a conventional type such as manufactured by Analog Devices Corporation and carrying their trade designation AD 7570.

OPERATION OF THE INVENTION

In describing the operation of the invention, it will be understood that computer 2 provides outputs in a predetermined sequence for closing normally open switches 18, 20, 22 and 24; for starting and clearing analog to digital converter 28; for enabling pulse burst generator 8; and for clearing digital rate multipliers 10 and 12 as is well known in the art with a computer of the type described.

The operational sequence of the invention may be started when computer 2 sets the input to digital rate multipliers 10 and 12 to the digital word 00000001 as indicated in the figure. Computer 2 clears analog to digital converter 28, closes switch 18 and enables pulse burst generator 8. This produces a single pulse at the input to current source 14, for example, resulting in a square wave of current applied to capacitor 4. The current produces an analog voltage $V_{DC} = I_{DC}/C$ as aforenoted.

Computer 2 opens switch 18 and closes switch 22. This applies the analog voltage across capacitor 4 to analog to digital converter 28 via high input impedance amplifier 26. Computer 2 starts analog to digital converter 28 which converts the applied analog voltage into a digital number which is stored in computer 2. Computer 2 uses the stored number to compute the exact value of the capacitance which is used in applying a correction to the cascaded arrangement of digital rate multipliers 10 and 12. Computer 2 opens switch 22 whereby the corrected information is applied to the digital rate multipliers, and closes switch 18.

Computer 2 enables pulse burst generator 8 which drives the cascaded arrangement of digital rate multipliers 10 and 12 to provide a number of pulses equal to the input to the digital rate multipliers multiplied by 256. This will cause current source 14 to provide an equivalent number of current pulses resulting in a voltage on capacitor 4 proportional to the number set on the digital rate multiplier input.

While the operation of the invention has been described with reference to providing a positive voltage on capacitor 4, like operation will result in providing a negative voltage on capacitor 6 by the operation of current source 16 and the opening and closing of switches 20 and 24 as will now be understood by those skilled in the art. Considering, for illustrative purposes, that the device of the invention is used in a weapons system which is fuzed so as to be actuated over a predetermined time-of-flight, the ratio of the voltages across capacitors 4 and 6 is proportional to the time-of-flight.

With reference now to FIG. 4, pulse burst generator 8 generally shown to FIG. 3 is shown in substantial detail. Thus, the pulse burst generator may include a conventional oscillator 30 which provides a square wave output. A conventional type flip-flop 32 having set and reset terminals is set by an enable input from computer 2 as heretofore described with reference to FIG. 3. The output of flip-flop 32 and the output of oscillator 30 are applied to a NAND gate 34. The pulse output from NAND gate 34 is applied to a conventional type digital counter 36 which divides the pulse output by 256, and which counter output is applied to the reset terminal of flip-flop 32. The operation of pulse burst generator 8 is such that a burst of pulses is provided at the output terminal of NAND gate 34 through a conductor 36 to digital rate multiplier 10 as will now be understood by those skilled in the art.

It will thus be seen from the aforegoing description of the invention with reference to the drawings that the heretofore noted objects have been met. Fuze setting apparatus has been described which provides for digital setting of R-C fuzes and corrects for variations in timing due to the deviation of capacitor values from nominal as is advantageous in fuzes of the type described and whereby timing accuracy is improved.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Digital apparatus for setting the voltage across capacitor means, comprising:

current source means for applying current pulses to the capacitor means, and initially applying a single current pulse to said capacitor means;

converting means for converting the analog voltage across the capacitor means provided in response to the single current pulse to a corresponding digital output;

computing means responsive to the digital output for computing the capacitance of the capacitor means and for providing a corresponding digital output;

a pulse source for providing a fixed number of pulses;

multiplying means connected to the computing means and to the pulse source for multiplying the fixed number of pulses from the pulse source by the digital output from the computing means and for providing a predetermined number of pulses; and the current source means connected to the last mentioned means and responsive to the predetermined number of pulses therefrom for applying a corresponding number of current pulses to the capacitor means for setting the voltage across the capacitor means.

2. Apparatus as described by claim 1, wherein:

the computing means provides a first output for clearing the converting means, a second output for starting the converting means to convert the analog voltage to the corresponding digital output, a third output for enabling the pulse source to provide the fixed number of pulses and a fourth output for clearing the multiplying means for multiplying the fixed number of pulses from the pulse source by the digital output from the computing means; and the first, second, third and fourth outputs being provided in a predetermined operating sequence.

3. Apparatus as described by claim 2, wherein the pulse source for providing a fixed number of pulses includes:

an oscillator for providing a square wave output;

a flip-flop having set and reset terminals, and connected at the set terminal to the computing means for being set by the third output therefrom whereby the pulse source is enabled;

NAND gate means connected to the oscillator and to the flip-flop and responsive to the outputs therefrom for providing a pulse output;

means connected to the NAND gate for dividing the pulse output therefrom by a number corresponding to the digital output of the computing means and for providing a corresponding output;

the reset terminal of the flip-flop connected to the dividing means and reset by the output therefrom; and the fixed number of pulses being provided in a pulse burst at the output of the NAND gate means.

4. Apparatus as described by claim 1, wherein:

the capacitor means includes a first capacitor and a second capacitor; and the current source means includes first means for applying current pulses in one sense to the first capacitor and second means for applying current pulses in an opposite sense to the second capacitor.

5. Apparatus as described by claim 4, including:

first normally open switching means connected intermediate the first means and the first capacitor;

second normally open switching means connected intermediate the second means and the second capacitor; and the computing means being effective for sequentially closing the first and second normally open switching means, whereupon the current pulses in the one sense from the first means and the current pulses in the opposite sense from the second means are sequentially applied to the first and second capacitors, respectively.

6. Apparatus as described by claim 5, including:

third normally open switching means connected intermediate the first capacitor and the first normally open switching means, and connected to the converting means;

fourth normally open switching means connected intermediate the second capacitor and the second normally open switching means, and connected to the converting means; and the computing means being effective for sequentially opening the first switching means and closing the third switching means, and opening the second switching means and closing the fourth switching means whereupon the voltage across the first and second capacitors are sequentially applied to the converting means.

* * * * *